US012583274B2

(12) United States Patent
Nordman et al.

(10) Patent No.: US 12,583,274 B2
(45) **Date of Patent: \*Mar. 24, 2026**

(54) COMPLIANT MECHANISM FOR SUSPENSION HEIGHT SENSOR

(71) Applicant: Tesla, Inc., Austin, TX (US)

(72) Inventors: Douglas Nordman, San Francisco, CA (US); Peter Hawkins, Cupertino, CA (US); Julian Pitt, Palo Alto, CA (US)

(73) Assignee: Tesla, Inc., Austin, TX (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/075,638

(22) Filed: Mar. 10, 2025

(65) Prior Publication Data

US 2025/0206092 A1 Jun. 26, 2025

Related U.S. Application Data

(63) Continuation of application No. 18/692,987, filed as application No. PCT/US2022/047269 on Oct. 20, 2022, now Pat. No. 12,280,629.

(60) Provisional application No. 63/263,013, filed on Oct. 25, 2021.

(51) Int. Cl.
B60G 7/00 (2006.01)
B60G 3/20 (2006.01)
B60G 17/019 (2006.01)

(52) U.S. Cl.
CPC .............. B60G 7/001 (2013.01); B60G 3/20 (2013.01); B60G 17/019 (2013.01); *B60G 2204/116* (2013.01); *B60G 2204/143* (2013.01)

(58) Field of Classification Search
CPC .............. B60G 7/001; B60G 2204/116; B60G 2400/0516; B60F 17/019; B60Y 2400/3012; G01G 19/12; F16B 2200/99
USPC ........................................ 403/220; 280/93.51
See application file for complete search history.

(56) References Cited

U.S. PATENT DOCUMENTS

| 12,280,629 B2 | 4/2025 | Nordman et al. |
| 2024/0286449 A1 | 8/2024 | Nordman et al. |

OTHER PUBLICATIONS

"U.S. Appl. No. 18/692,987 Preliminary Amendment filed Mar. 18, 2024", 6 pgs.
"U.S. Appl. No. 18/692,987, Non Final Office Action mailed Sep. 19, 2024", 12 pgs.
"U.S. Appl. No. 18/692,987, Response filed Nov. 15, 2024 to Non Final Office Action mailed Sep. 19, 2024", 12 pgs.
"U.S. Appl. No. 18/692,987, Notice of Allowance mailed Dec. 18, 2024", 7 pgs.
"U.S. Appl. No. 18/692,987, Corrected Notice of Allowability mailed Feb. 20, 2025", 2 pgs.

*Primary Examiner* — Paul N Dickson
*Assistant Examiner* — Tiffany L Webb
(74) *Attorney, Agent, or Firm* — Schwegman Lundberg & Woessner, P.A.

(57) ABSTRACT

A compliant mechanism is provided for monitoring the position of a suspension of a vehicle. The compliant mechanism can include a body for coupling to both an angle sensor and the suspension of the vehicle. The body can have at least two first portions and at least one second portion. The second portion is coupled to both of the two first portions and is more flexible than the two first portions.

24 Claims, 5 Drawing Sheets

COMPLIANT MECHANISM FOR SUSPENSION HEIGHT SENSOR

CROSS-REFERENCE TO RELATED APPLICATIONS

This application is a continuation of and claims the benefit of priority of U.S. application Ser. No. 18/692,987, filed Mar. 18, 2024, which is a U.S. National Stage Filing under 35 U.S.C. § 371 from International Application No. PCT/US2022/047269, filed on Oct. 25, 2021, and published as WO2023/076099 on May 4, 2023, which claims the benefit of U.S. Provisional Application No. 63/263,013, filed Oct. 25, 2021; the benefit of priority of each of which is hereby claimed herein, and which applications and publication are hereby incorporated herein by reference in their entireties.

TECHNICAL FIELD

This application relates to an apparatus and method for monitoring the relative position between two objects, and in particular, to an apparatus for monitoring the position of a suspension of a vehicle with respect to a frame of the vehicle.

BACKGROUND

Generally described, a variety of vehicles, such as electric vehicles, combustion engine vehicles, hybrid vehicles, commercial vehicles, trucks, semi-trucks, etc., can be configured with adjustable suspensions, e.g., an air suspension. A position sensor can be used to determine the relative movement of a suspension with respect to a frame. For example, a position sensor and mechanical linkages can be used in connection therewith to determine the relative movement of the suspension with respect to the frame. Such mechanical linkages are complex and time-consuming to manufacture as well as present a long term reliability issue due to the number of rigid, complex, components forming the mechanical linkages.

SUMMARY

An aspect is directed to a compliant mechanism for monitoring the position of a suspension of a vehicle. The compliant mechanism can include at least a first link and a second link, both of the first and second links forming at least a portion of the compliant mechanism, the first link having a body, a first end and a second end, the first end being configured for securement to a sensor attached to a frame of the vehicle, the sensor being configured to monitor angular position of the first link relative to the frame, the second end having an engagement structure, the second link having a body, a first end and a second end, the first end having an engagement structure, and a flexible joint coupled to both the engagement structure of the first link and the engagement structure of the second link so as to allow relative movement between the first and second links.

A variation of the aspect above is, wherein the first and second links are more rigid than the flexible joint.

A variation of the aspect above is, wherein the first and second links are plastic.

A variation of the aspect above is, wherein the flexible joint is rubber.

A variation of the aspect above is, wherein the flexible joint is over molded with the first and second links.

A variation of the aspect above is, wherein the engagement structures of the first and second links are formed as grooves.

A variation of the aspect above is, wherein the flexible joint has a body, a first end and a second end, the first and second ends having shapes complementary to the grooves in the first and second links.

A variation of the aspect above is, wherein the body of the second link comprises a one or more grooves or recesses to reduce the mass of the second link.

A variation of the aspect above is, wherein the second end of the second link comprises an engagement structure, and further comprising, a third link, the third link having a body, a first end and a second end, the first end of the third link being configured for securement to the suspension of the vehicle, the second end of the third link having an engagement structure, and a second flexible joint coupled to both the engagement structure of the second link and the engagement structure of the third link so as to allow relative movement between the second and third links.

A variation of the aspect above is, wherein the second and third links are more rigid than the second flexible joint.

A variation of the aspect above is, wherein the third link is plastic.

A variation of the aspect above is, wherein the second flexible joint is rubber.

A variation of the aspect above is, wherein the second flexible joint is over molded with the second and third links.

A variation of the aspect above is, wherein the engagement structures of the second end of the second link and of the third link are formed as grooves.

A variation of the aspect above is, wherein the second flexible joint has a body, a first end and a second end, the first and second ends having shapes complementary to the grooves in the second and third links.

A variation of the aspect above further comprises the sensor.

A variation of the aspect above is, wherein the sensor is an angle sensor.

A variation of the aspect above is, wherein the sensor is a Hall-effect type sensor.

An aspect is directed to a compliant mechanism for monitoring the position of a suspension of a vehicle. The compliant mechanism can include a body configured to be coupled to both an angle sensor and the suspension of the vehicle, the body comprising at least two first portions and at least one second portion, the second portion being coupled to both of the at least two first portions, the second portion being more flexible than the at least two first portions.

A variation of the aspect above is, wherein the first portion is plastic and the second portion is rubber.

An aspect is directed to a method for monitoring a position of a suspension of a vehicle. The method comprises providing a compliant mechanism coupled to both an angle sensor and the suspension of the vehicle, the compliant mechanism comprising at least two first portions and at least one second portion, the second portion being coupled to and more flexible than both of the at least two first portions, receiving a signal from the angle sensor related to vehicle height, comparing the vehicle height to a target height, and activating a suspension component based on the comparison.

A variation of the aspect above is, wherein the signal is voltage.

A variation of the aspect above is, wherein the angle sensor is a Hall-effect type sensor.

A variation of the aspect above further comprises determining the vehicle height based at least in part on one or more look-up tables.

A variation of the aspect above further comprises determining the vehicle height based at least in part on one or more predetermined parameters.

A variation of the aspect above further comprises mapping the signal to determine the vehicle height.

A variation of the aspect above is, wherein the target height is a predetermined value.

A variation of the aspect above is, wherein the target height is user selected.

A variation of the aspect above is, wherein activating the suspension component based on the comparison occurs when a difference between the vehicle height and the target height exceeds a predetermined tolerance.

A variation of the aspect above further comprises moving the suspension component from a first position to a second position, wherein the difference between the vehicle height and the target height decreases when the suspension component moves from the first position to the second position.

A variation of the aspect above is, wherein activating the suspension component based on the comparison comprises sending a control signal to the suspension component.

An aspect is directed to a compliant mechanism configured to be coupled to a sensor for monitoring a position of a suspension of a vehicle, the sensor being attached to a frame of the vehicle. The compliant mechanism comprises a first link having a body, a first end and a second end, the first end being configured for securement relative to the sensor so that the sensor can monitor an angular position of the first link relative to the frame, a second link, and a flexible joint coupled between the second end of the first link and the second link so as to allow relative movement between the first link and the second link, wherein the first link and the second link are more rigid than the flexible joint.

A variation of the aspect above is, wherein the first link and the second link are plastic.

A variation of the aspect above is, wherein the flexible joint is rubber.

A variation of the aspect above is, wherein the flexible joint is over molded with at least one of the first link or the second link.

A variation of the aspect above is, wherein the second link is coupled to the suspension of the vehicle.

A variation of the aspect above further comprises a third link and a second flexible joint coupled between the second link and the third link so as to allow relative movement between the second link and the third link, wherein the second link and the third link are more rigid than the second flexible joint.

A variation of the aspect above is, wherein the third link is configured to be coupled to the suspension of the vehicle.

A variation of the aspect above further comprises the sensor.

A variation of the aspect above is, wherein the sensor is an angle sensor.

A variation of the aspect above is, wherein the sensor is a Hall-effect type sensor.

BRIEF DESCRIPTION OF THE DRAWINGS

The present inventions are described with reference to the accompanying drawings, in which like reference characters reference like elements, and wherein.

DETAILED DESCRIPTION

Figure 1:
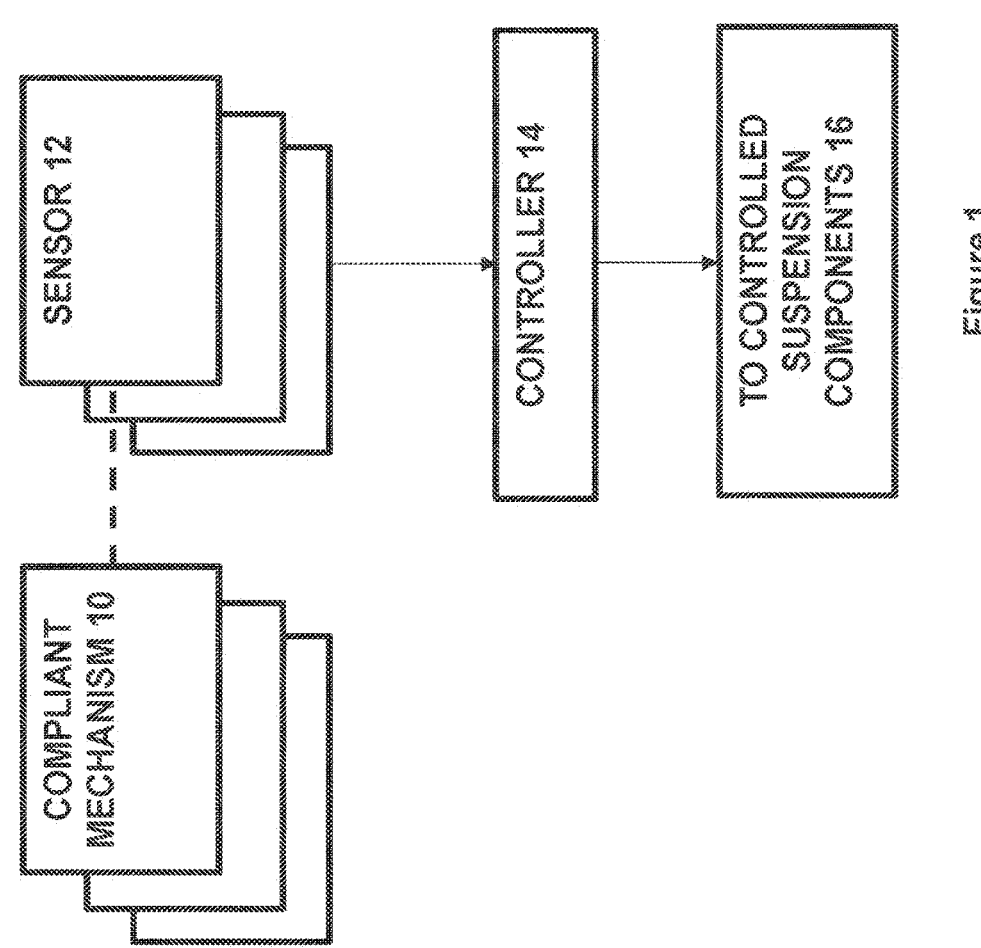
FIG. 1 is a block diagram of a system including a compliant mechanism, a sensor, and a controller for monitoring and adjusting a ride height of a vehicle according to an example embodiment of the present disclosure.

Generally described, one or more aspects of the present disclosure relate to monitoring the relative position between two objects. For example, a vehicle with air suspension requires some sensor to measure the position (specifically ride height) of the suspension relative to the frame. In certain embodiments, this can be accomplished using an angle sensor. In certain embodiments, the angle sensor can be fixed to the frame of the vehicle, and further attached to the suspension with a mechanical linkage. The mechanical linkage converts 3D motion (e.g., displacement in X, Y, and Z axis) of the suspension to angular motion at the sensor. Such mechanical linkages are complex and time-consuming to manufacture as well as present a long term reliability issue due to the number of rigid, complex, components forming the mechanical linkages.

Embodiments disclosed herein can provide advantages over such mechanical linkages. For example, in certain embodiments, a compliant mechanism can significantly reduce the number of components required to couple the suspension to the frame. This reduction of components can significantly reduce the supply-chain overhead, installation time, and cost of the linkage. In certain embodiments, the compliant mechanism can have an improved reliability due to, for example, the reduction in components.

In certain embodiments, the compliant mechanism comprises a combination of rigid and flexible components. For example, in certain embodiments, the compliant mechanism comprises one or more flexible joints interposed between a plurality of links of the compliant mechanism. In certain embodiments, the one or more flexible joints are made from the same material as the plurality of links of the compliant mechanism but have a reduced cross sectional area increasing their flexibility. In certain embodiments, the flexible joints are made from a different material (e.g., rubber) than the plurality of links of the compliant mechanism (e.g., plastic). For example, in certain embodiments, the flexible joints are made from plastic while the plurality of links are made of metal.

In certain embodiments, the compliant mechanism is assembled from one or more flexible joints. In certain embodiments, the flexible joints are made from a different material than the plurality of links. In certain embodiments, the flexible joints are over molded with the plurality of links.

While the compliant mechanism disclosed herein is described in the context of monitoring a position of a suspension of the vehicle with respect to a frame of the vehicle, the invention is not so limited. Embodiments of the compliant mechanism described herein can be employed in the place of any linkage that is intended to transfer or monitor motion.

The characteristics of the compliant mechanism (e.g., size, weight, pressure, materials, etc.) disclosed herein are only exemplary. The one or more flexible joints and the plurality of links can be made from any material as well as from different materials. For example, the materials can be selected to withstand significant elastic strain without yielding while also minimizing deflection in a nominal condition. For example, if the angular motion of the compliant mechanism is relatively small, a single material can be used for the compliant mechanism. In certain embodiments, the compliant mechanism can comprise plastic and steel. In embodiments where the angular motion of the compliant mechanism is large, a flexible materials (e.g., rubber and the like) can be used for the one or more flexible joints in combination with a stiffer material (e.g., plastic, metals (steel, aluminum, etc.)) for the plurality links.

In certain embodiments, the compliant mechanism mimics a mechanical linkage. For example, the compliant mechanism can comprise stiff sections (e.g., the plurality of links) and flexible sections (e.g., one or more flexible joint). A computer simulation can be employed to further optimize the compliant mechanism in a different manner to further reduce material/size taking into account the intended operational environment of the compliant mechanism.

Figure 2:
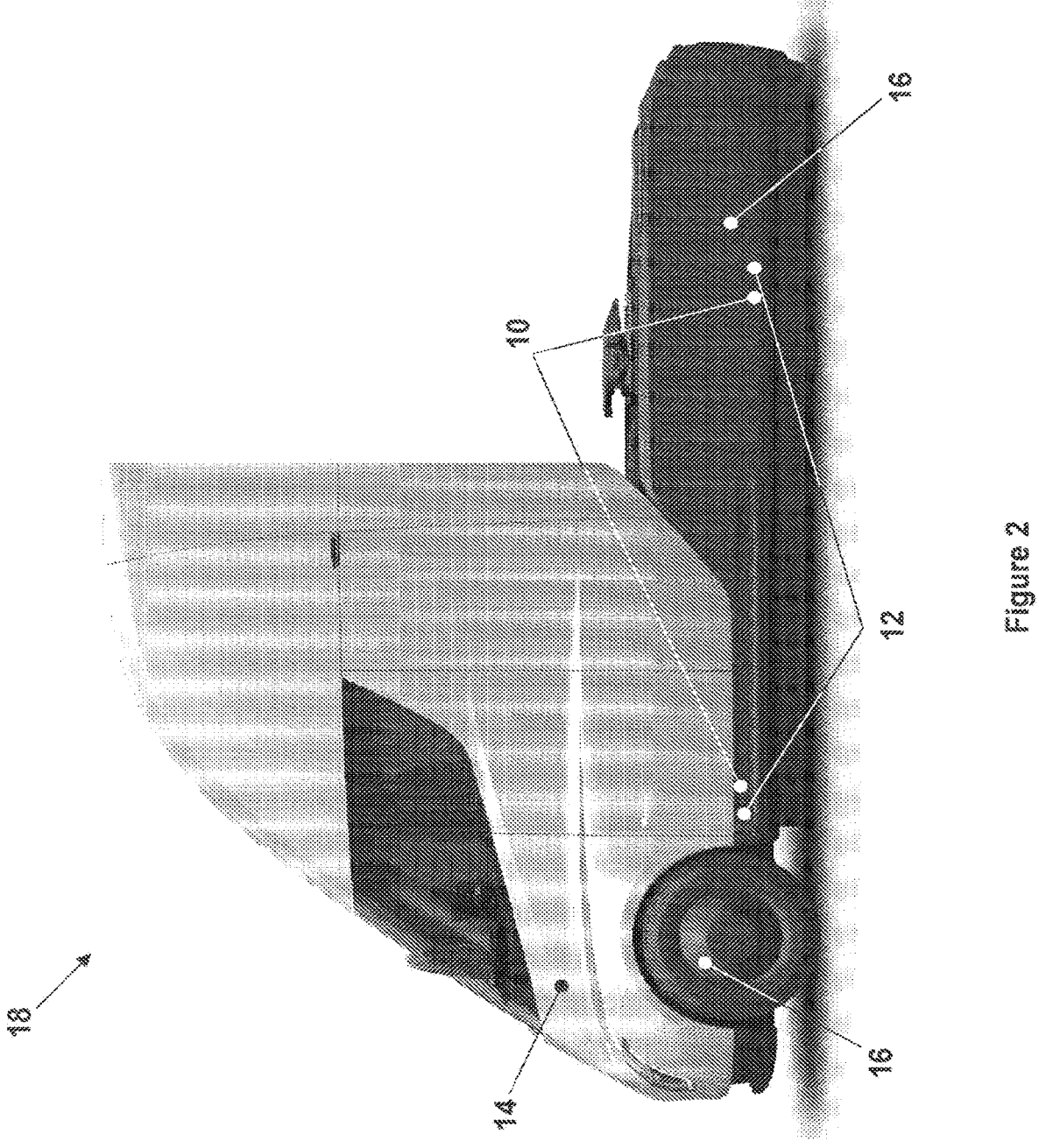
FIG. 2 is an example illustration of a vehicle that includes the system of FIG. 1.

FIG. 1 is a block diagram of a system 8 that comprises a compliant mechanism 10, one or more sensors 12, and a controller 14 for monitoring and adjusting a ride height of a vehicle 18. For example, FIG. 2 is an exemplary illustration of the vehicle 18 that includes the system 8 of FIG. 1. As shown in FIGS. 1 and 2, the system 8 can include the compliant mechanism 10, the one or more sensors 12, and the controller 14. In certain embodiments, the system 8 can comprise one or more suspension components 16 (e.g., wheel/tire, spring, shock absorber, rod, joint, bar, bearing, bushing, steering system, and/or etc.) of the vehicle 18. In certain embodiments, the controller 14 is configured to control the system 8, e.g., whether to and/or how to, e.g., position, speed, etc., one or more suspension components 16 upon receiving information from the one or more sensors 12. The sensor 12, such as a position sensor, an angle sensor, or the like, can receive information about the position of the compliant mechanism 10 such as, for example, angular position. In certain embodiments, the one or more sensors 12 are configured to generate and/or send a signal and/or information to the controller 14 indicative of an attribute (e.g., angle) of the compliant mechanism 10. In certain embodiments, the one or more sensors 12 provide feedback electrical signals (e.g., voltage signals) to the controller 14 that are related to the ride height measurement and/or angle measurement at one or more corners of the vehicle 18.

In certain embodiments, the one or more sensors 12 are configured to generate and/or send a signal and/or information to the controller 14 indicative of one or more forces being experienced by the compliant mechanism 10. In certain embodiments, the one or more sensors 12 are configured for detecting characteristics of the forces. For example, the characteristic can include a level of strain experienced by the compliant mechanism 10. In certain embodiments, the one or more sensors 12 is configured to generate and/or send a signal and/or information to the controller 14 indicative of the sensed characteristic. In certain embodiments, the one or more sensors 12 include one or more strain gages.

In certain embodiments, the controller 14 receives the signals from the one or more sensors 12 to at least in part determine a position for one or more suspension components 16. In certain embodiments, the controller 14 can determine operational parameters for the one or more suspension components 16, such as piston speeds, pressures, extension times or other operational parameters of the one or more suspension components 16. The specified operational parameters for the one or more suspension components 16 can be selected with consideration of enhancing driving characteristics of the vehicle 18.

For example, in certain embodiments, the controller 14 compares the signal from the sensor 12 to data in one or more look-up tables and/or one or more predetermined parameters to at least in part determine operational parameters for the one or more suspension components 16. For example, in certain embodiments, the controller 14 can utilize logic control in the form of the look-up table to map information from the sensors 12 to operational parameters of the one or more suspension components 16. In some embodiments, the look-up table can map individual sensor 12 values to determine operational parameters for the one or more suspension components 16 that have been determined to be controlling in the selection of the operational parameters of the one or more suspension components 16. In other embodiments, the look-up table can combine individual sensor 12 values to determine the operational parameters of the one or more suspension components 16.

In certain embodiments, the sensor 12 values can be specified as absolute values that are mapped in the look-up table, ranges of values, binary indications (e.g., on or off), or non-numeric categories (e.g., high, medium, or low). Still further, the look-up table can incorporate weighting values such that the sensor 12 values can have greater impact or are otherwise ordered in a manner that causes the impact of specific input information to influence the determined operational parameters of the one or more suspension components 16.

In certain embodiments, the look-up tables utilized by the controller 14 can be specifically configured to individual vehicles 18. Alternatively, the look-up tables can be common to a set of vehicles 18, such as by vehicle type, geographic location, user type, and the like. The look-up tables may be statically configured with the controller 14, which can be periodically updated. In other embodiments, the look-up tables can be more dynamic in which the frequency of update can be facilitated via communication functionality associated with the vehicle 18.

In certain embodiments, the look-up table can be configured in a programmatic implementation. Such programmatic implementations can be in the form of mapping logic, a sequence of decision trees, or similar logic. In other embodiments, the controller 14 may incorporate machine learning implementations that may require more refined operation of the one or more suspension components 16.

Figure 3:
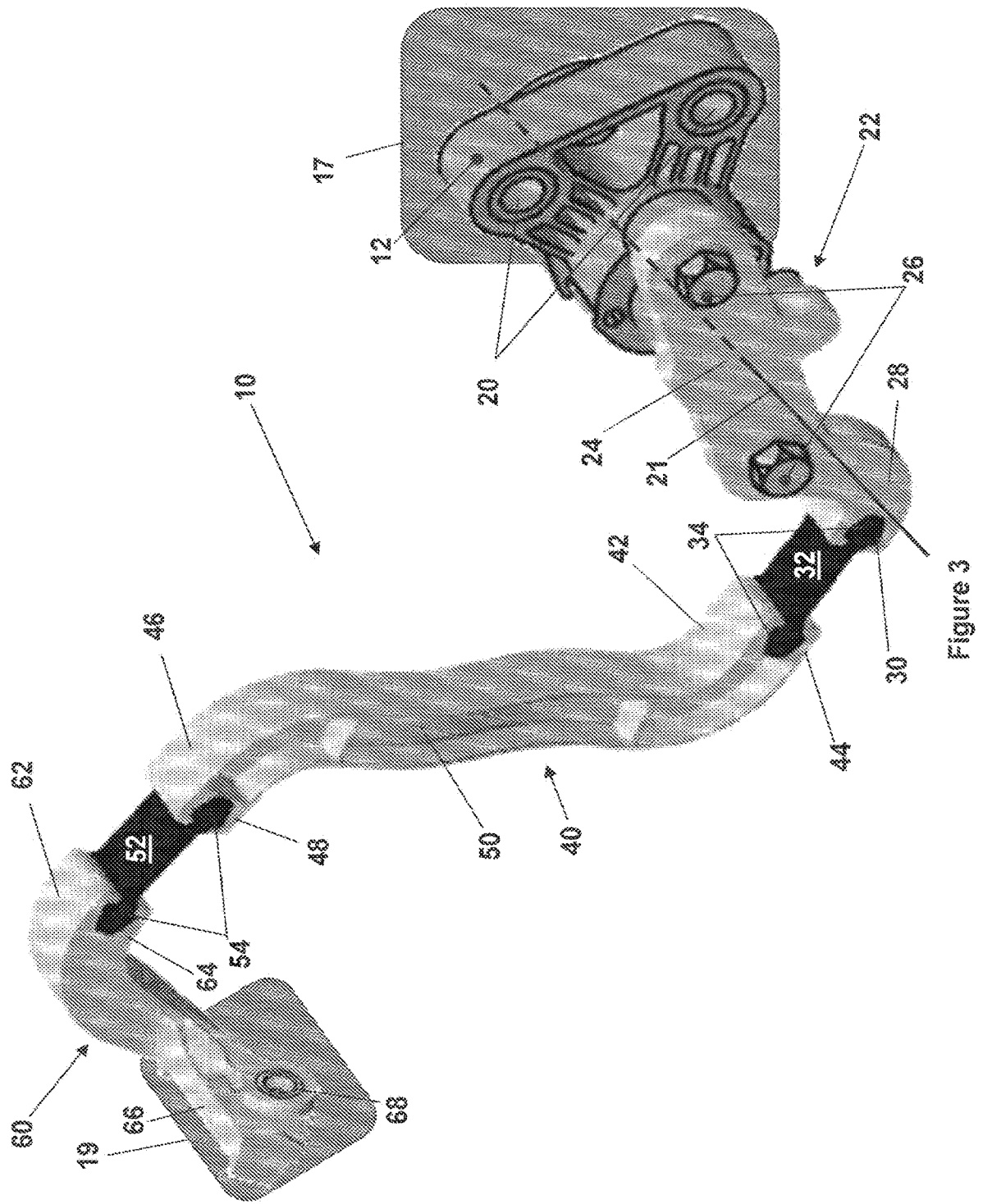
FIG. 3 is a side perspective view of the compliant mechanism and sensor from FIG. 1.

FIG. 3 is a side perspective view of the compliant mechanism 10 and the sensor 12 from FIG. 1. In the illustrated embodiment, the sensor 12 monitors angular position. In certain embodiments, the sensor 12 is fixedly attached to a first member 17 by one or more fasteners. For example, the sensor 12 can comprise a pair of mounting apertures 20 juxtaposed across the sensor 12 and adapted to received mounting hardware such as bolts therein. In certain embodiments, the first member 17 is a frame of the vehicle 18 or a portion thereof. In certain embodiments, the compliant mechanism 10 couples a second member 19 of the vehicle 18 to the sensor 12. In certain embodiments, the second member 19 is a suspension of the vehicle 18 or a portion thereof.

In certain embodiments, the compliant mechanism 10 comprises a combination of rigid (e.g., links 22, 40, 60) and flexible components (e.g., flexible joints 32, 52). For example, in certain embodiments, the compliant mechanism 10 comprises one or more flexible joints 32, 52 and a plurality of links 22, 40, 60. In the illustrated embodiment, the one or more flexible joints 32, 52 are interposed between the plurality of links 22, 40, 60. For example, the flexible joint 32 is interposed between link 22 and link 40 while the flexible joint 52 is interposed between link 40 and link 60. Of course, the compliant mechanism 10 is not limited to the illustrated number of flexible joints and links and can include any number of flexible joints and links.

In the illustrated embodiment, the link 22 includes a first end 24 pivotally attached to the sensor 12 at a pivot point along a pivot axis 21. One or more fasteners 26 can secure the first end 24 to the sensor 12 so that the link 22 can pivot relative to the first member 17.

In certain embodiments, the link 22 also has a second end 28 that includes an engagement structure 30. In certain embodiments, the engagement structure is sized and shaped to receive an engagement structure 34 of the flexible link 32. In the illustrated embodiment, the engagement structure 30 of the link 22 is formed as a groove while the engagement structure 34 of the flexible link 32 is formed as a tongue having a complementary shape. The engagement structures 30, 34 are not limited to the illustrated shapes and can have any shape that allows the link 22 to engage with the flexible link 32.

In certain embodiments, the compliant mechanism 10 further includes a link 40 having a first end 42 that includes an engagement structure 44. In certain embodiments, the engagement structure is sized and shaped to receive an engagement structure 34 of the flexible link 32. In the illustrated embodiment, the engagement structure 44 of the link 40 is formed as a groove while the engagement structure 34 of the flexible link 32 is formed as a tongue having a complementary shape. The engagement structures 44, 34 are not limited to the illustrated shapes and can have any shape that allows the link 40 to engage with the flexible link 32. In certain embodiments, the link 40 comprises one or more grooves or recesses 50. In certain embodiments, the one or more grooves or recesses 50 can reduce the mass of the link 40. Of course, even though the one or more grooves or recesses 50 are illustrated in the link 40, the other links 22, 60 can also comprise the one or more grooves or recesses 50.

In certain embodiments, the link 40 also has a second end 46 that includes an engagement structure 48. In certain embodiments, the engagement structure is sized and shaped to receive an engagement structure 54 of the flexible link 52. In the illustrated embodiment, the engagement structure 48 of the link 40 is formed as a groove while the engagement structure 54 of the flexible link 52 is formed as a tongue having a complementary shape. The engagement structures 48, 54 are not limited to the illustrated shapes and can have any shape that allows the link 40 to engage with the flexible link 52.

In certain embodiments, the compliant mechanism 10 further includes a link 60 having a first end 62 that includes an engagement structure 64. In certain embodiments, the engagement structure is sized and shaped to receive an engagement structure 54 of the flexible link 52. In the illustrated embodiment, the engagement structure 64 of the link 60 is formed as a groove while the engagement structure 54 of the flexible link 52 is formed as a tongue having a complementary shape. The engagement structures 64, 54 are not limited to the illustrated shapes and can have any shape that allows the link 60 to engage with the flexible link 52.

In certain embodiments, the link 60 also has a second end 66 that is pivotally attached to the second member 19. In the illustrated embodiment, the second end 66 comprises one or more holes 68 configured to receive a fastener for securing the compliant member 10 to the second member 19. In the illustrated example, the second member 19 includes a vehicle suspension or chassis system, or portion thereof. In certain embodiments, the sensor 12 monitors the distance between the first member 17 and the second member 19, which is movable with respect to first member 17, by monitoring the angular position of the link 22. In certain embodiments, the sensor 12 is a Hall-effect type sensor as is well known in the art. Of course, other types of sensors can be employed while still falling within the scope of this disclosure.

As explained above, in certain embodiments, the compliant mechanism 10 mimics a mechanical linkage. For example, the compliant mechanism 10 can comprise stiff sections (e.g., the plurality of links 22, 40, 60) and flexible sections (e.g., one or more flexible joint 32, 52). In certain embodiments, a computer simulation can be employed to further optimize the compliant mechanism 10 in a different manner to further reduce material/size taking into account the intended operational environment of the compliant mechanism 10.

In certain embodiments, the one or more flexible joints 32, 52 are made from the same material as the plurality of links 22, 40, 60 of the compliant mechanism 10. In certain embodiments, the one or more flexible joints 32, 52 have a reduced cross sectional area than that of the plurality of links 22, 40, 60 increasing the flexibility of the one or more flexible joints 32, 52. In certain embodiments, the flexible joints 32, 52 are made from a different material (e.g., rubber or the like) than the plurality of links 22, 40, 60 of the compliant mechanism 10 (e.g., plastic or the like). For example, in certain embodiments, the flexible joints 32, 52 are made from plastic while the plurality of links 22, 40, 60 are made of metal.

In certain embodiments, the compliant mechanism 10 is assembled from one or more flexible joints 32, 52 and a plurality of links 22, 40, 60. In certain embodiments, the flexible joints 32, 52 are made from a different material than the plurality of links 22, 40, 60. In certain embodiments, the flexible joints 32, 52 are over molded with the plurality of links 22, 40, 60.

While the compliant mechanism 10 disclosed herein is described in the context of monitoring a position of a suspension 19 of the vehicle 18 with respect to the frame 17 of the vehicle 18, the invention is not so limited. Embodiments of the compliant mechanism 10 described herein can be employed in the place of any linkage that is intended to transfer or monitor motion.

Characteristics of the compliant mechanism 10 (e.g., size, weight, pressure, materials, etc.) disclosed herein are only exemplary. In certain embodiments, the one or more flexible joints 32, 52 and the plurality of links 22, 40, 60 can be made from any material as well as from different materials. For example, the materials can be selected to withstand significant elastic strain without yielding while also minimizing deflection in a nominal condition. For example, if the angular motion of the compliant mechanism 10 is relatively small, a single material can be used for the compliant mechanism 10. In certain embodiments, the compliant mechanism 10 can comprise plastic and steel. In embodiments where the angular motion of the compliant mechanism is large, a flexible materials (e.g., rubber and the like) can be used for the one or more flexible joints 32, 52 in combination with a stiffer material (e.g., plastic, metals (steel, aluminum, etc.)) for the plurality links 22, 40, 60.

Figure 4:
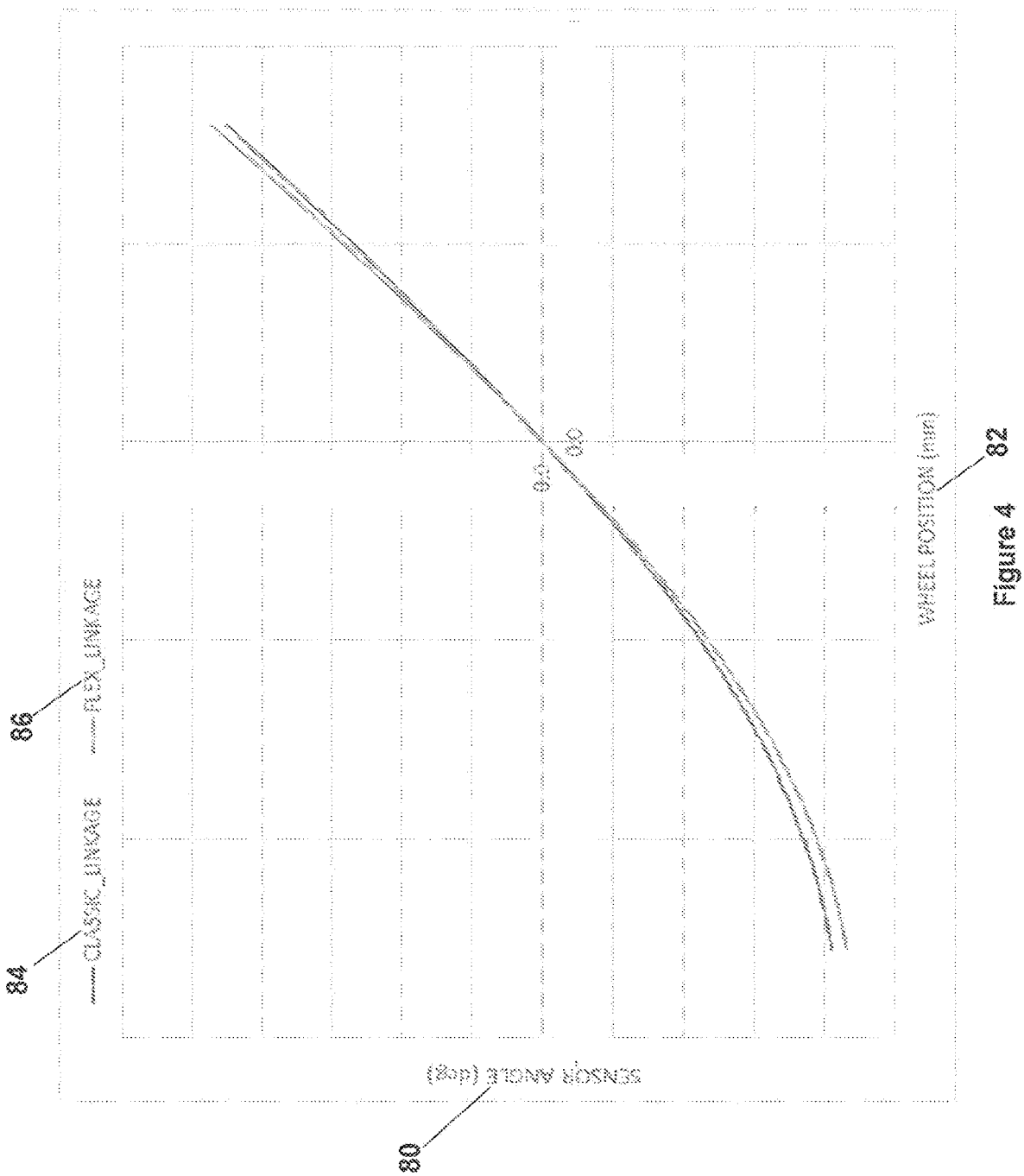
FIG. 4 is a chart of sensor angle vs. wheel position for the compliant mechanism of FIG. 3 as compared to a rigid linkage.

FIG. 4 is a chart of sensor angle 80 vs. wheel position 82 for the compliant mechanism of FIG. 3 as compared to a rigid or classic linkage. In certain embodiments, the relationship between wheel/suspension position 82 and sensor angle 80 is non-linear. In certain embodiments, a look-up table can be generated that accounts for this non-linearity. In certain embodiments, the look-up table is generated based on a computer simulation of the motion path to calculate the wheel/suspension position 82 (sensor angle→look-up table→wheel/suspension position). In certain embodiments, the controller 14 can access the look-up table.

In certain embodiments, the compliant mechanism 10 comprises a pivot point of flexure which can slightly drift relative to a designed pivot point. In certain embodiments, the drift is very small in relation to the movement of the links (~0.1% or less contribution). In certain embodiments, this drift is accounted for in the look-up table. In certain embodiments, the look-up table can be flashed to the firmware of the vehicle 18.

Figure 5:
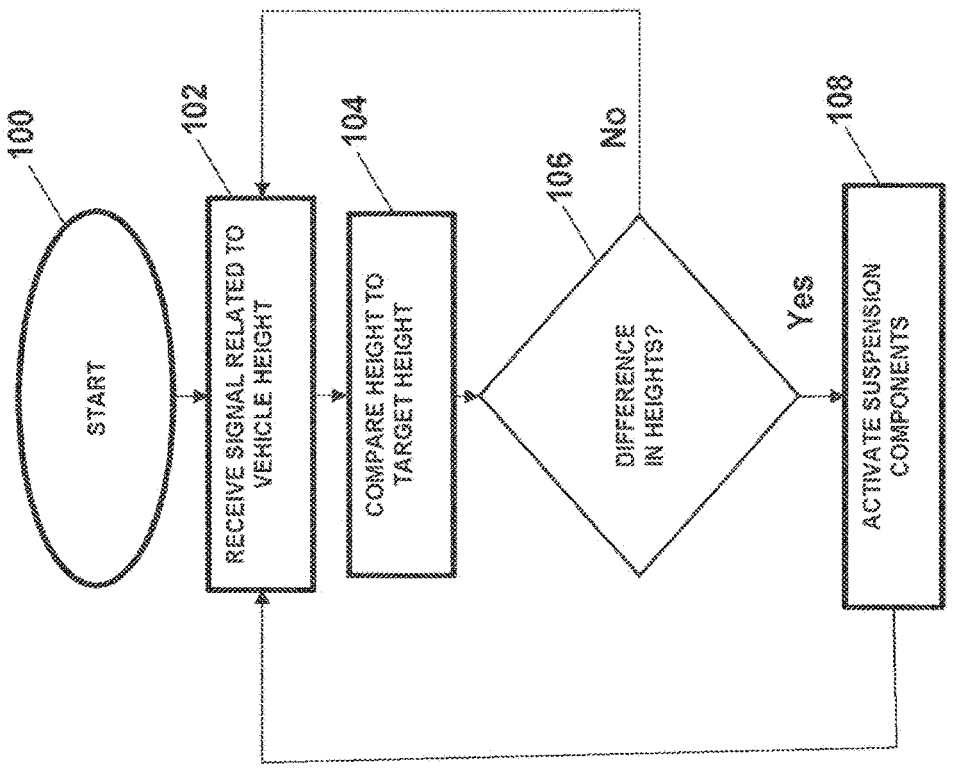
FIG. 5 is a flow chart of an exemplary process performed by the controller from FIG. 1.

FIG. 5 is a flow chart of an exemplary process that can be performed by the controller 14 from FIG. 1. The process may be implemented for each individual compliant mechanism 10, such as by the controller 14. Alternatively, the process may be implemented for a set of compliant mechanisms 10 located on the vehicle 18.

The process begins at block 100. At block 102, the controller 14 receives a signal indicative of a vehicle ride height. For example, the one or more sensors 12 can provide feedback voltage signals to the controller 14 that are related to the angle measurement at each corner of the vehicle 18.

At block 104, the controller 14 compares the signal indicative of, e.g., angle, to data in one or more look-up tables and/or one or more predetermined parameters to at least in part determine the wheel/suspension position or ride height. For example, in certain embodiments, the controller 14 can utilize logic control in the form of the look-up table to map information from the sensor 12 to ride height. In some embodiments, the look-up table can map individual sensor 12 values to determine operational parameters for the suspension components. The controller 14 can compare the determined ride height to a target height. The target height can be, for example, a predetermined value or a user selected value.

At block 106, the controller 12 determines whether there is a difference between the ride height and the target height. If there is no significant difference (outside of tolerances), the process can return to block 102. If there is a significant difference (outside of tolerances), the process can move to block 108. At block 108, the controller 12 can transmit information or control signals that cause the suspension components 16 to move to a selected position within a selected time frame in accordance with the operational parameters of the suspension system. In certain embodiments, the trigger signal or actuation profile takes into account one or more characteristics of the suspension component 16 to enhance the ride of the vehicle 18. In certain embodiments, the controller 12 moves the suspension components 16 to achieve a level ride height for the vehicle 18.

In certain embodiments, the controller 12 provides the determined operational parameters of the suspension components 16 in the form of an activation profile. In certain embodiments, the activation profile is customized for the vehicle 18 based on, for example, one or more user settings and or weight of the vehicle 18.

The process returns to block 102 in embodiments for continuous monitoring. Alternatively, the process can wait for institution of the routine process.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed glove box actuation assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A compliant mechanism for monitoring a position of a suspension of a vehicle, comprising:

at least a first link and a second link forming at least a portion of the compliant mechanism;

the first link having a first end configured for securement to a sensor attached to a frame of the vehicle;

the second link having a first end;

a separate flexible joint made from a flexible material and coupled between the first and second links to allow relative movement between the first and second links through flexing of the flexible joint, wherein the flexible joint is over molded with the first and second links;

wherein the sensor is configured to monitor angular position of the first link relative to the frame.

2. The compliant mechanism of claim 1, wherein the first link and the second link are more rigid than the flexible joint.

3. The compliant mechanism of claim 1, wherein the first link and the second link are plastic.

4. The compliant mechanism of claim 1, wherein the flexible joint includes rubber.

5. The compliant mechanism of claim 1, wherein the first link has a second end having an engagement structure, and the second link has an engagement structure at the first end, the flexible joint being coupled to both engagement structures.

6. The compliant mechanism of claim 5, wherein the engagement structures of the first and second links are formed as grooves.

7. The compliant mechanism of claim 6, wherein the flexible joint has a body, a first end and a second end, the first and second ends having shapes complementary to the grooves in the first and second links.

8. The compliant mechanism of claim 1, wherein the second link has a body comprising one or more recesses to reduce a mass of the second link.

9. The compliant mechanism of claim 1, wherein the second link has a second end, and the compliant mechanism further comprises:

a third link having a first end configured for securement to the suspension of the vehicle; and a second flexible joint coupled between the second end of the second link and the third link so as to allow relative movement between the second and third links.

10. The compliant mechanism of claim 9, wherein the second and third links are more rigid than the second flexible joint.

11. The compliant mechanism of claim 9, wherein the third link is plastic.

12. The compliant mechanism of claim 9, wherein the second flexible joint is rubber.

13. The compliant mechanism of claim 9, wherein the second flexible joint is over molded with the second and third links.

14. The compliant mechanism of claim 1, wherein the sensor is an angle sensor.

15. The compliant mechanism of claim 1, wherein the sensor is a Hall-effect type sensor.

16. A compliant mechanism for monitoring a position of a suspension of a vehicle, comprising:

at least a first link and a second link forming at least a portion of the compliant mechanism;

the first link having a first end configured for securement to a sensor attached to a frame of the vehicle;

the second link having a first end;

a separate flexible joint made from a flexible material and coupled between the first and second links to allow relative movement between the first and second links through flexing of the flexible joint, wherein the flexible joint includes rubber; and wherein the sensor is configured to monitor angular position of the first link relative to the frame.

17. A compliant mechanism for monitoring a position of a suspension of a vehicle, comprising:

at least a first link and a second link forming at least a portion of the compliant mechanism;

the first link having a first end configured for securement to a sensor attached to a frame of the vehicle;

the second link having a first end;

a separate flexible joint made from a flexible material and coupled between the first and second links to allow relative movement between the first and second links through flexing of the flexible joint, wherein the first link has a second end having an engagement structure, and the second link has an engagement structure at the first end, the flexible joint being coupled to both engagement structures; and wherein the sensor is configured to monitor angular position of the first link relative to the frame.

18. The compliant mechanism of claim 17, wherein the engagement structures of the first and second links are formed as grooves.

19. The compliant mechanism of claim 18, wherein the flexible joint has a body, a first end and a second end, the first and second ends having shapes complementary to the grooves in the first and second links.

20. A compliant mechanism for monitoring a position of a suspension of a vehicle, comprising:

at least a first link and a second link forming at least a portion of the compliant mechanism;

the first link having a first end configured for securement to a sensor attached to a frame of the vehicle;

the second link having a first end;

a separate flexible joint made from a flexible material and coupled between the first and second links to allow relative movement between the first and second links through flexing of the flexible joint;

wherein the second link has a second end, and the compliant mechanism further comprises:

a third link having a first end configured for securement to the suspension of the vehicle; and a second flexible joint coupled between the second end of the second link and the third link so as to allow relative movement between the second and third links; and wherein the sensor is configured to monitor angular position of the first link relative to the frame.

21. The compliant mechanism of claim 20, wherein the second and third links are more rigid than the second flexible joint.

22. The compliant mechanism of claim 20, wherein the third link is plastic.

23. The compliant mechanism of claim 20, wherein the second flexible joint includes rubber.

24. The compliant mechanism of claim 20, wherein the second flexible joint is over molded with the second and third links.

* * * * *